United States Patent Office 3,400,126
Patented Sept. 3, 1968

3,400,126
2-(4-PYRIDYL)ETHANOL DERIVATIVES
Bernard Brust, Parsippany, Troy Hills, Rodney Ian Fryer, North Caldwell, and Leo Henryk Sternbach, Upper Montclair, N.J., assignors to Hoffmann-La Roche Inc., Nutley, N.J., a corporation of New Jersey
No Drawing. Continuation-in-part of application Ser. No. 395,302, Sept. 9, 1964. This application June 21, 1965, Ser. No. 465,718
14 Claims. (Cl. 260—247.5)

ABSTRACT OF THE DISCLOSURE

2(4-pyridyl)ethanol derivatives are prepared by reacting a 4 picolyl compound with a ketone. The products so obtained have useful anti-convulstant properties and also diminish Tremorine induced tremors and alter the activity of liver microsomal enzyme systems.

---

This application is a continuation-in-part of application Ser. No. 395,302, filed Sept. 9, 1964, now abandoned.

This invention relates to novel compounds as well as to methods for preparing same. More particularly the invention pertains to novel 2(4-pyridyl)ethanols and to ethylene and ethane compounds derived therefrom. The novel compounds of this invention can be represented by the following formulas:

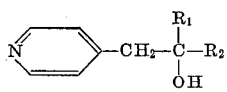

I

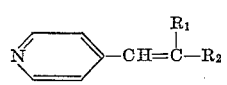

II

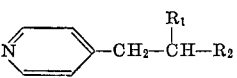

III wherein $R_1$ and $R_2$ are each independently selected from the group consisting of lower alkyl, halogeno-lower alkyl, aralkyl, lower alkylene, lower aliphatic ether, lower alkylene aryl ether, lower alkylene arkylene ether, 5- and 6-membered heterocyclic groups, bicyclic heterocyclic groups having 7 to 10 atoms in the nucleus, cycloalkyl of 3 to 8 carbon atoms, amino, substituted amino, aminomethylene, lower alkyl substituted aminomethylene and di-substituted aminomethylene in which the two substituents together are lower alkylene, aza-lower alkylene, oxa-lower alkylene, or thia-lower alkylene such that the di-substituted amino group is part of a heterocyclic nucleus of 5 or 6 members having one or more hetero-atoms in addition to the nitrogen of the amino group which may be either nitrogen, oxygen, or sulfur. Heterocyclic groups having 1 to 2 hetero atoms are preferred.

Additionally, $R_1$ and $R_2$ taken together can represent an alkylene, aza-alkylene, N-lower alkyl-aza-alkylene, oxo-alkylene or thia-alkylene group in which the alkyl portion of said alkylene, aza-alkylene, oxa-alkylene or thia-alkylene group contains from 2 to 7 carbon atoms so as to form with the carbon to which it is joined a lower alkyl substituted or unsubstituted cyclic group, i.e., a cyclic alkyl group of 3 to 8 carbon atoms, a monocyclic heterocyclic group of from 3 to 8 members having one or more hetero atoms which may be either nitrogen, sulfur or oxygen or a bicyclic heterocyclic group of from 7 to 10 members having one or more hetero atoms which may be either nitrogen, sulfur or oxygen. Thus, for example, when $R_1$ and $R_2$ together represent oxabutylene, the grouping

is a furan group. Preferred monocyclic or bicyclic heterocyclic groups are those having 1 to 2 hetero atoms in the nucleus. Especially preferred heterocyclic groups are the monocyclic heterocyclic groups of 5 or 6 members having a single hetero atom which may be either sulfur, oxygen or nitrogen.

$R_1$ and $R_2$ taken together with the carbon atom to which they are attached can also represent a xanthene group such that the compounds of Formulas I, II and III are 9-substituted xanthenes, a cycloheptene group such that the compounds of Formulas I, II and III are 5-substituted-10,11-dihydro - 5H - dibenzo[a,d]cycloheptenes or 5-substituted-5H-dibenzo[a,d]cycloheptenes.

In addition $R_1$ and $R_2$ can be unsubstituted phenyl or phenyl bearing one or more substituents such as hydroxy, amino, lower alkylamino, halogen, trifluoromethyl, lower alkyl, lower alkoxy and the like with the proviso that when $R_1$ and $R_2$ are both selected from the group consisting of phenyl and substituted phenyl as defined herein at least one of $R_1$ and $R_2$ must be a substituted. Unsubstituted phenyl and phenyl bearing a single substituent in either the ortho-, meta- or para-position constitute a preferred group.

In the case of compounds of Formulas I and II above either or both of the symbols $R_1$ and $R_2$ can also represent a lower alkenyl or a lower alkynyl group or an aralkenyl group.

The invention also embraces within its scope medicinally acceptable acid addition salts with the compounds of Formulas I, II, and III above.

The novel compounds of Formula I above wherein $R_1$ and $R_2$ taken collectively with the carbon to which they are attached form a monocyclic group can be represented by the formula

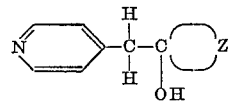

I-a wherein the symbol Z represents a lower alkylene, oxa-lower alkylene, aza-lower alkylene or thia-lower alkylene group.

The novel compounds of Formula II above wherein $R_1$ and $R_2$, taken collectively with the carbon to which they are attached, form a cyclic group can be represented by the formula

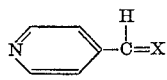

II-a wherein the symbol X represents a monocyclic carbocyclic hydrocarbon of 3 to 8 carbon atoms; a monocyclic heterocyclic group having 5 to 6 members in the heterocyclic portion thereof or a bicyclic heterocyclic group having from 7 to 10 members in the nucleus.

The novel compounds of Formula III above wherein $R_1$ and $R_2$, taken collectively with the carbon to which they are attached, form a cyclic group can be represented by the formula

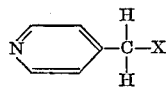

III-a wherein the symbol X has the same significance as above.

As used in this disclosure the term "halogen" comprehends all four halogens, viz., chlorine, bromine, iodine and fluorine. The term "lower alkyl" as used herein includes lower aliphatic hydrocarbons having 1–7 carbon atoms in the carbon chain. It includes straight chain as well as branched chain radicals. The term includes for example methyl, propyl, isopropyl, etc. The term "halogeno-lower alkyl" includes lower alkyl as defined above wherein one or more of the hydrogen atoms has been substituted by a halogen atom such as for example trifluoromethyl and the like. The terms "lower alkenyl" and "lower alkynyl" connote unsaturated lower aliphatic hydrocarbons and such groups wherein one or more of the hydrogens have been replaced by halogen. The term "aryl" as used throughout this disclosure denotes a monocyclic aromatic hydrocarbon radical preferably of 6 to 10 carbon atoms such as for example phenyl, tolyl and the like. The term "aryl" also includes aromatic hydrocarbons as defined above in which one or more hydrogen atoms of the phenyl portion have been substituted by a functional group such as halogen, hydroxyl, lower alkyl, trifluoromethyl, amino, substituted amino or lower alkoxy. The term "aralkyl" encompasses lower alkyl groups in which an aryl group as defined above is substituted for a hydrogen atom such as for example; benzyl, phenethyl or the like and also includes such groups in which one or more of the hydrogen atoms of the phenyl portion have been substituted by a functional group as indicated above. The "lower alkylene, lower aliphatic ether" groups of this invention are the ether groups in which a lower alkylene group is joined through an ether linkage to a lower aliphatic group. The term "lower aliphatic" as used throughout this disclosure denotes lower alkyl groups of from 1 to 7 carbon atoms as well as lower alkenyl and lower alkynyl groups of from 2 to 7 carbon atoms respectively. The "lower alkylene aryl ether" groups are those wherein a lower alkylene group is joined through an ether linkage to an aryl group as defined above and the "lower alkylene aralkyl" ether groups of this invention are those wherein a lower alkylene group is joined through an ether linkage to an aralkyl group as defined above.

The term "substituted phenyl" as used in this application comprehends phenyl groups in which one or more of the hydrogens have been substituted by a functional group such as hydroxy, halogen, trifluoromethyl, lower alkyl amino, substituted amino or lower alkoxy. The term "cycloalkyl" encompasses saturated monocyclic groups having from 3 to 8 carbon atoms such as cyclopropyl, cyclobutyl, cyclopentyl, cyclohexyl, cycloheptyl and cyclooctyl. The term "substituted amino" comprehends both mono- and di-substituted amino groups, i.e., amino groups in which one or both of the hydrogens have been replaced by a functional group such as lower alkyl either straight or branched chain, e.g., methyl, ethyl, propyl, isopropyl and the like; aryl, e.g., phenyl, substituted phenyl as defined herein, benzyl, phenethyl, etc.; or acyl, e.g., lower alkanoyl, benzoyl, substituted benzoyl, i.e., a benzoyl group having one or more substituents on the phenyl ring as defined by the term "substituted phenyl" hereinabove, etc. As substituted amino the N-lower alkylamino, N,N-di-lower alkylamino, N-phenyl-amino, N-phenyl-N-lower alkylamino, N-benzoylamino and N-lower alkyl-N-benzoylamino constitute a preferred group. As used in this application, the term "5- and 6-membered heterocyclic groups" encompasses the monocyclic 5- and 6-membered hetero rings having at least one hetero atom in the ring which may be either nitrogen, oxygen or sulfur. Representative hetero radicals falling within this description are, for example, pyridyl, thienyl, furyl, pyrryl and the like. Additionally, the invention comprehends those compounds wherein the cycloalkyl radicals and the 5- and 6-membered heterocyclic radicals, as defined above, have further substituents in their ring portions. Such additional substituents may be any of the ordinary functional groups such as hydroxy, halogen, lower alkyl and lower alkoxy. The term "bicyclic heterocyclic groups" encompasses bridged heterocyclic compounds such as, for example, quinuclidinol.

The novel compounds of this invention, i.e., the compounds of Formulas I, II and III above and their pharmaceutically acceptable acid addition salts are useful as anti-convulsants. The compounds of this invention relieve or diminish tremors which are brought about in animals by Tremorine, i.e., 1,4-di-pyrrolidino-2-butyne with a minimum of peripheral anticholinergic side effects. Additionally, they reduce hypothermia produced by Tremorine. Thus, the compounds are indicated for use in the study of the treatment of tremors which are characteristic of Parkinson's Disease. Furthermore, the compounds of this invention alter the activity of the liver microsomal drug metabolizing enzymes. For example, they inhibit the following enzymatic oxidative reactions: hexobarbital to ketohexobarbital, acetanilid to p-hydroxyacetanilid, amphetamine to phenylacetone, dilantin to its p-hydroxy derivatives, etc. On prolonged administration the compounds of this invention stimulate the activity of the liver microsomal drug metabolizing enzymes. Because of their activity, these compounds provide a valuable tool for the study of the drug metabolizing enzyme systems associated with the liver microsomes and are useful in the study and treatment of diseases caused by metabolic failures of such enzyme systems, for example, in the treatment of phenylketonuria. The compounds of this invention can be administered internally, for example, orally and parenterally. They can be administer either in the base form or as their acid addition salts with dosages adjusted to individual requirements. They can be prepared for administration by formulation into conventional pharmaceutical forms such as tablets, capsules, suppositories, injectable solutions and the like. Additionally, the compounds of Formulas I and II are useful as intermediates in the preparation of compounds of Formula III as will be more fully set out in the description of their preparation and in the specific examples which follow.

The novel carbinols of this invention, i.e., the compounds of Formula I, can be prepared by reacting a 4-picolyl metal compound having the formula

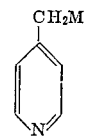

IV in which the symbol M represents an alkali metal such as sodium, potassium or lithium, or a halogeno metal such as halogeno magnesium in which case the compound of Formula IV is a 4-pyridyl magnesium halide, e.g., 4-pyridyl magnesium chloride with a ketone of the formula

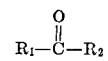

V wherein $R_1$ and $R_2$ have the same significance as above.

Thus, there can be employed as starting materials a wide variety of ketones represented by Formula V above. One can, for example, use any of the symmetric ketones in which the symbols $R_1$ and $R_2$ in the above Formula V represent like groups selected from the various aliphatic, aromatic, aliphatic-carbocyclic and heterocyclic groups included within the meaning of the symbols $R_1$ and $R_2$ as defined in Formulas I, II and III herein. The compounds of Formula V above can also be asymmetrical ketones, i.e., ketones in which the symbols $R_1$ and $R_2$ in the above Formula V represent unlike groups independently selected from the various aliphatic, aromatic, aliphatic-carbocyclic and heterocyclic groups represented by the symbols $R_1$ and $R_2$ as defined in Formulas I, II and II herein. One can also use as starting material a cyclic ketone, for example, a monocyclic carbocyclic ketone, a monocyclic heterocyclic, or a bicyclic heterocyclic ketone, e.g., ketones of the above Formula V wherein the symbols $R_1$ and $R_2$ together represent an alkylene, aza-alkylene, oxa-alkylene or a thia-alkylene group.

The reaction of the 4-picolyl metal compound (Formula IV) with the appropriate ketone of Formula V is carried out preferably in an inert solvent or mixture of solvents in which one is an ether, for example, a mixture of benzene with an ether such as diethyl ether, tetrahydrofuran, dioxane and the like. The reaction can be carried out over a wide range of temperatures though it is preferred to operate at a temperature of about 25°. The reaction could, however, if desired, be carried out at a higher or lower temperature than above. A preferable temperature range for carrying out this reaction is between about $+10°$ and $+60°$.

The novel ethylenes of this invention, i.e., the compounds of Formula II are prepared by dehydration of the Formula I carbinols. In general, the dehydration can be carried out by any method which is known per se. In a preferred embodiment of the invention, dehydration of the Formula I compound is effected by heating, preferably at a temperature within the range of from about 60° to about 100° in the presence of a concentrated mineral acid, for example, sulfuric acid, hydrochloric acid, nitric acid and the like. Sulfuric acid is the preferred dehydrating agent. Other dehydrating agents such as phosphorous trihalide, e.g., phosphorous trichloride and phosphorous tribromide, acetic anhydride or mixtures of acetic anhydride and zinc anhydride could also be used. The dehydration could also be carried out by refluxing the Formula I compound in a solution of iodine and toluene. Other dehydration processes whereby the Formula II compounds are obtained from the corresponding Formula I compounds will be immediately apparent to those skilled in the art.

The novel ethanes of this invention, i.e., the compounds of Formula III are prepared by hydrogenation of the corresponding Formula II compounds. In general, the hydrogenation is carried out in the presence of a hydrogenation catalyst. As the hydrogenation catalyst, one can employ Raney nicel, palladium, platinum or any other nown hydrogenation catalyst. While the hydrogenation can be effected at an elevated temperature and/or at an elevated pressure, the reaction is preferably carried out at room temperature and atmospheric pressure.

As has been stated heretofore, the compounds represented by Formulas I, II and III of this invention, being basic in character, can form acid addition salts with acids such as the mineral acids, e.g., hydrohalic acids, for example, hydrochloric acid, hydrobromic acid and the like, nitric acid, sulfuric acid, phosphoric acid, as well as organic acids such as maleic acid, citric acid, tartaric acid, fumaric acid and the like. These salts are formed by simply mixing solutions of the appropriate base with a solution of the desired acid. Pharmaceutically acceptable acid addition salts are prepared from pharmaceutically acceptable acids.

The following examples illustrate the invention and are not to be constructed as limitations thereon. All temperatures are in degrees centigrade and all melting points are corrected.

Example 1

An ether, benzene solution of 0.5 mole of phenyl lithium was added dropwise over a period of 30 min. to a stirred solution of 46.6 g. (0.5 mole) of gamma picoline in 350 ml. of tetrahydrofuran, under dry nitrogen. The reaction mixture was held at 15 to 25° with an ice bath during the addition and was then stirred 30 min. at room temperature. The resulting gamma picolyl lithium solution was used as starting material in the subsequent examples.

In place of the gamma-picolyl lithium, there could also be used gamma-picolyl magnesium halide or gamma-picolyl sodium or potassium. Gamma-picolyl magnesium bromide was prepared by the dropwise addition of 64.9 g. (0.7 m.) of gamma-picoline to a stirred, refluxing solution of ethyl magnesium bromide [from 17 g. (0.7 m.) of magnesium and 76.3 g. (0.7 m.) of ethyl bromide] in 350 ml. of tetrahydrofuran.

Example 2

To 0.5 mole of gamma-picolyl lithium, under nitrogen and chilled to 0°, a solution of 60.1 g. (0.5 mole) of acetophenone in 250 ml. of dry tetrahydrofuran was added dropwise over one hour. The reaction mixture was stirred overnight and then hydrolyzed with 100 ml. of water. The reaction mixture extracted three times with 150 ml. portions of 6 N hydrochloric acid. The combined acid extracts were washed three times with 100 ml. portions of ether and neutralized with ammonium hydroxide over ice. Filtration yielded crude 2 - phenyl - 1 - (4-pyridyl) - 2 - propanol, melting at 78–85°. Three recrystallizations from ethanol-water gave the product as colorless plates, melting at 83–85°.

Example 3

To 0.25 mole of gamma-picolyl lithium at 10°, a solution of 10.9 g. (70.5 mmole) of 2' - chloroacetophenone in 25 ml. of tetrahydrofuran was added dropwise over 30 min. The reaction mixture was stirred overnight and worked up as described in Example 2 to give 2 - (2-chlorophenyl) - 1 - (4 - pyridyl) - 2 - propanol, melting at 137–140°. Three recrystallizations from acetone gave the product as colorless prisms, melting at 139–141°.

Example 4

To 0.25 mole of gamma-picolyl lithium at 10°, a solution of 24.2 g. (0.20 mole) of 4-acetylpyridine in 100 ml. tetrahydrofuran was added dropwise over 30 min. The reaction mixture was stirred 30 min. at 25° and was then hydrolyzed and extracted with hydrochloric acid. The acid extract was washed with ether and neutralized to give an oil. The ammonial mixture was extracted with methylene chloride which was dried over magnesium sulfate and reduced in vacuo to an oil. Trituration with hexane, yielded 2 - (4 - pyridyl) - 1 - (4 - pyridyl) - 2-propanol, melting at 130–135°. Three recrystallizations from ethyl acetate-hexane gave the pure product as colorless prisms, M.P. 135–138°.

Example 5

To a stirred solution of 0.25 mole gamma-picolyl lithium under dry nitrogen and chilled to 10°, a solution of 37.6 g. (0.2 mole) of 2 - benzoylthiophene in 50 ml. of tetrahydrofuran was added dropwise over about 1 hr. The reaction mixture was stirred for 4 hr. at room temperature and then hydrolyzed. Addition of hydrochloric acid yielded the wate insoluble hydrochloride of 1 - phenyl-2 - (4 - pyridyl) - 1 - (2 - thienyl)ethanol, melting at 238–241°. The salt was stirred overnight in 250 ml. of concentrated ammonium hydroxide, yielding 1 - phenyl-2 - (4 - pyridyl) - 1 - (2 - thienyl)ethanol, melting at 152–154°. Two aditional recrystallizations from ethanol gave the product as colorless plates melting at 153–154°.

Example 6

To a stirred solution of 0.25 mole gamma-picolyl lithium under dry nitrogen at 10°, a solution of 35.5 g. (0.13 mole) of 4,4' - bis(dimethylamino)benzophenone in 50 ml, of tetrahydrofuran was added dropwise in 1 hr. The reaction mixture was stirred overnight at room temperature, hydrolyzed with water and extracted three times with 100 ml. portions of 6 N hydrochloric acid. The acid extracted was washed with ether and poured into a mixture of 250 ml. of concentrated ammonium hydroxide and 500 g. of ice. Filtration yielded 1,1 - bis(4 - dimethylaminophenyl) - 2 - (4 - pyridyl) - ethanol. Recrystallization from ethanol yielded the pure compound as colorless needles, melting at 211–213°.

Water was added to the mother liquor of 1,1 - bis(4- dimethylaminophenyl) - 2 - (4 - pyridyl) - ethanol and 1,1 - bis(4 - dimethylaminophenyl) - 2 - (4 - pyridyl) ethylene crystallized as straw yellow needles melting at 135–137°. Recrystallization from ethanol-water gave an analytical sample, melting at 138–138.5°.

Example 7

To a stirred solution of 0.25 mole of gamma-picolyl lithium under dry nitrogen and chilled to 10°, a solution of 15.02 g. (0.1 mole) of phenoxy-2-propanone in 50 ml. of tetrahydrofuran was added dropwise over a 45 min. period. The reaction mixture was allowed to stir overnight at room temperature, was hydrolyzed with 50 ml. of water and then extracted three times with 100 ml. portions of 6 N hydrochloric acid. The acid extract was washed with ether and poured into an excess of chilled ammonium hydroxide. The crude product was a colorless oil which slowly crystallized during vigorous stirring of the chilled ammonia mixture. Filtration yielded colorless crystalline 2-(phenoxymethyl)-1-(4-pyridyl)-2-propanol which was recrystallized three times from ethanol-water to give colorless needles, melting at 67–80°.

Example 8

Alpha-aminoacetophenone for use as starting materials in the preparation of 3-amino-2-phenyl-1-(4-pyridyl-2-propanols were prepared by the following method. A solution of 20.0 g. (0.13 mole) of alpha-chloroacetophenone in 250 ml. of ether was added to a solution of 0.26 mole of the appropriate amine in 250 ml. of ether. The reaction mixture was stirred at reflux temperature overnight and the amine hydrochloride removed by filtration. The etheral solution was extracted with 250 ml. of 3 N hydrochloric acid in three portions. The acid extract was neutralized with sodium hydroxide and the organic base was removed by ether extraction. The extract was dried over magnesium sulfate and solvents were removed under vacuo to give the crude alpha-aminoketone.

Alpha-piperidinoacetophenone was prepared by using piperidine as the amine in the above process. The crude product obtained in this way was distilled at reduced pressure, yielding alpha-piperidinoacetophenone, B.P. 97–99° (0.18 mm.).

Alpha-morpholinoacetophenone was prepared by using morpholine in the method described above. The crude product obtained in this way solidified on standing to give alpha-morpholinoacetophenone, melting at 45–52°.

Alpha-(4-methylpiperazino)acetophenone was prepared by using methylpiperazine in the above process. The crude alpha-(4-methylpiperazino)acetophenone was isolated as an oily product which was used without further purification.

Example 9

3-amino-2-phenyl-1-(4-pyridyl)-2-propanols were prepared from the appropriate alpha-aminoketones by the following procedure.

To a stirred solution of 0.25 mole of gamma-picolyl lithium chilled to 10° and under dry nitrogen, a solution of 56 to 90 mmole of the appropriate alpha-aminoketone in 50 to 200 ml. of tetrahydrofuran was added dropwise over 1 hour. The reaction mixture was allowed to stir overnight at room temperature and was hydrolyzed with 50 ml. of water. The reaction mixture was extracted three times with 100 ml. portions of 6 N hydrochloric acid. The combined acid extracts were then washed with ether and poured into 250 ml. of concentrated ammonium hydroxide and 500 g. of ice.

Example 10

2-phenyl-1-piperidino-3-(4-pyridyl)-2-propanol was prepared according to the method of Example 9 by using alpha-piperidinoacetophenone as the appropriate alpha-aminoketone. The basic mixture obtained in this way was vigorously stirred and colorless crystalline 2-phenyl-1-piperidino-3-(4-pyridyl)-2-propanol, M.P. 83–88°, was obtained by filtration. Three recrystallizations from hexane gave the pure compound as colorless needles, melting at 89–91°.

Example 11

1-morpholino-2-phenyl-3-(4-pyridyl) - 2 - propanol was prepared according to the method described in Example 9 above using alpha-morpholinoacetophenone. The basic solution obtained in this procedure was extracted with methylene chloride, the organic layer dried over magnesium sulfate and reduced in vacuo to a yellow oil. Crystallization from hexane gave 2-morpholino-2-phenyl-3-(4-pyridyl)-2-propanol, melting at 103–105°. Three recrystallizations from hexane gave the product as colorless prisms melting at 104–105°.

Example 12

1-(4-methylpiperizino)-2-phenyl-3-(4-pyridyl) - 2 - propanol was prepared according to the method described in Example 9 above using alpha-(4-methylpiperazino)-acetophenone. The basic solution obtained in procedure was extracted with methylene chloride. The organic extract was dried over magnesium sulfate and reduced in vacuo to an oil which was distilled giving 1-(4-methylpiperizino)-2-phenyl-3-(4-pyridyl) - 2 - propanol (B.P. 133–134° [0.6 mm]). The oil slowly crystallized giving colorless prims melting at 60–70°. Recrystallization from hexane gave the pure compound as colorless prisms melting at 79–81°.

Example 13

A solution of 39.2 g. (0.4 mole) of cyclohexanone in 100 ml. of anhydrous tetrahydrofuran was added dropwise to a stirred, 0.5 molar solution of gamma-picolyl lithium maintained at 0°±5°. The resulting mixture was stirred at room temperature for 1 hr. and then 1 liter of water was added. The solution was made acidic by the addition of hydrochloric acid, extracted with ether (3×200 ml.) and then made basic with 10 N sodium hydroxide solution. The precipitate was collected on a filter, washed with water and recrystallized from acetone to give 1-(4-pyridylmethyl) cyclohexanol as white prims melting at 130.5–131°.

Example 14

A solution of 45.3 g. (0.4 mole) of freshly distilled N-methyl-4-piperidone in 100 ml. of anhydrous tetrahydrofuran was added dropwise to a stirred, 0.5 molar solution of γ-picolyl lithium maintained at −5°±5°. The reaction mixture was allowed to warm to room temperature, and stirred for an additional hour when 500 ml. of water was added. The layers were separated and the aqueous layer was extracted with dichloromethane (4×100 ml.). The organic layers were combined, washed with saturated brine (2×100 ml.) and concentrated. Distillation at 70°/3 mm. removed the starting materials and left a crystalline residue. Recrystallization from acetone gave pure 1-methyl-4-(4-pyridylmethyl)-4-piperidinol as white prisms melting at 134–136°.

Example 15

A suspension of 61 g. of quinuclidinone hydrochloride in 50 ml. of water was treated with an ice cold solution of 50 g. of potassium hydroxide in 50 ml. of water. The mixture was chilled and precipitated potassium chloride was removed by filtration. The filtrate was extracted with benzene (6×200 ml.). The benzene layers were combined, dried over anhydrous sodium sulfate, filtered and evaporated to give 36.9 g. of 3-quinuclidinone as the base.

A solution of 36.9 g. (0.295 mole) of 3-quinuclidinone in 400 ml. of anhydrous tetrahydrofuran was added dropwise to a stirred, 0.5 molar solution of gamma-picolyl lithium maintained at −10°±5°. The viscous suspension was stirred at −10° for 1 hr. and then at room temperature for 1 hr. when 300 ml. of water was added. The precipitate was obtained by filtration, washed with water (4×50 ml.) and recrystallized from an acetone-hexane mixture. 3-(4-pyridylmethyl)-3-quinuclidinol was obtained as colorless prisms melting at 179–180°.

Example 16

A solution of 62 g. (0.4 mole) of p-chloroacetophenone in 100 ml. of anhydrous tetrahydrofuran was added dropwise to a stirred, 0.5 molar solution of gamma-picolyl lithium maintained at 0°±5°. The reaction mixture was stirred for 1 hr. and then treated with water, acidified with hydrochloric acid and filtered. The acidic solution was made basic with 10 N sodium hydroxide solution and extracted with ether (3×300 ml.). The ether extracts were combined, washed with water, dried over anhydrous sodium sulfate, filtered and evaporated. The resulting oil was treated with 200 ml. of water and stirred rapidly in order to remove unreacted picoline and effect crystallization of the product. Filtration and recrystallization of the precipitate from an acetone-hexane mixture gave 2-(4-chlorophenyl)-1-(4-pyridyl)-2-propanol as white prisms melting at 121-24°.

Example 17

A solution of 11.6 g. (0.2 mole) of acetone in 100 ml. of anhydrous tetrahydrofuran was slowly added to a stirred 0.5 molar solution of gamma-picolyl lithium at −25°±5°. The mixture was stirred at −20° for 1 hr. and at room temperature for 1.5 hr. Water (50 ml.) and benzene (1.5 liter) were added and the layers were separated. The organic layer was filtered over 100 g. of neutral, activated alumina and the products washed through with an additional 4 liters of benzene. Solvents were removed and the residue was distilled at reduced pressure. A forerun B.P. 37°/14 mm. was discarded. A second fraction consisting mainly of 2-methyl-1-(4-pyridyl)-2-propanol (B.P. 79–99°/0.75 mm.) followed by the pure 2-methyl-1-(4-pyridyl)-2-propanol (B.P. 99–101°/0.7 mm.) was obtained.

A solution of 14.7 g. of 2-methyl-1-(4-pyridyl)-2-propanol in 300 ml. of ether was treated with a solution of 21.8 g. of maleic acid in 300 ml. of ether. The mixture was refrigerated and the salt removed by filtration. Recrystallization from an ethanol/mixture gave the pure maleate as white prisms melting at 94–98°.

Example 18

To a stirred 0.5 molar solution of gamma-picolyl lithium maintained at −20°±5°, 34.5 g. (0.4 mole) of 3-pentanone was added. The reaction mixture was stirred at −20° for 1 hr. and at room temperature for 2 hrs. and then treated with 50 ml. of water. The mixture was acidified with hydrochloric acid, the layers were separated and the organic phase was extracted with 3 N hydrochloric acid (2×125 ml.). The acid layers were combined, washed with ether (2×100 ml.), made basic with 10 N sodium hydroxide solution (temperature maintained at <10°) and extracted with dichloromethane (4×150 ml.). The dichloromethane layers were combined, washed with saturated brine (2×100 ml.), dried over sodium sulfate, filtered and evaporated. The residual oil was distilled and 1,1-diethyl-2-(4-pyridyl)ethanol was obtained as the main fraction (B.P. 150–153°/10 mm.; M.P. 62–64°). Recrystallization from an ether-petroleum ether (B.P. 30–60°) mixture gave the pure product as white rods, melting at 63–64°.

Example 19

A solution of 19.8 g. (0.2 mole) of N-methylpyrrolidone in 200 ml. of anhydrous tetrahydrofuran was added (1 hr.) to a stirred, 0.5 molar, solution of gamma-picolyl lithium maintained at 0°±5°. The mixture was stirred for 1 hr. at 0°, treated with 1 liter of ice water and maintained at 5° for 18 hrs. The precipitate was removed by filtration and was recrystallized from an ether-petroleum ether (B.P. 30–60°) mixture to give 1-methyl-2-(4-pyridylmethylene)pyrrolidine as pale yellow rods melting at 76°–78°.

Example 20

A solution of 2.5 g. (16.5 mmole) of 2-methyl-1-(4-pyridyl)-2-propanol in 50 ml. of 6 N sulfuric acid was heated under reflux for 16 hrs. The mixture was cooled, made basic with ammonium hydroxide and extracted with dichloromethane (3×50 ml.). The organic layers were combined, dried over anhydrous sodium sulfate, filtered and evaporated to give 1,1-dimethyl-2-pyridylethylene as an oil. The oil was vacuum distilled to give the pure product (B.P. 35–36°/3.5×10$^{-1}$ mm.). The 1,1-dimethyl-2-pyridylethylene product was dissolved in 50 ml. of ether which was then saturated with hydrogen chloride. The salt was obtained by filtration and recrystallized from an ethanol, hexane mixture to give the pure compound melting at 142–150° as colorless rods.

Example 21

An ether benzene solution containing 0.11 mole of 4-picolyl lithium solution was added to a stirred solution of 20.9 g. (0.100 mole) of 4-pyridylstyryl ketone dissolved in 55 ml. of tetrahydrofuran, held at 0°, under nitrogen. The resulting mixture was stirred 4 hours at 0°, allowed to warm to room temperature and was then poured into excess ice and hydrochloric acid. The pH was adjusted to 8 by the addition of aqueous ammonia. The mixture was extracted with an ether benzene mixture. The combined organic extracts were dried over sodium sulfate and concentrated. The solid obtained was crystallized from ethanol to give 1-phenyl-3,4-di(4-pyridyl)-3-hydroxy-1-butene melting at 188.5–191.5° C.

Example 22

An ether benzene solution of 0.110 mole of 4-picolyl lithium was added under a nitrogen atmosphere to a solution of 28.7 g. (0.100 mole) of 3,3-diphenyl-1-(4-pyridyl)-1-propanone in 125 ml. of tetrahydrofuran at 0°. After stirring 4 hours, the reaction mixture was poured onto ice and an excess of hydrochloric acid and the pH was adjusted to pH 8 by addition of aqueous ammonia. After extraction with ether, the solid which formed in the ether layer was removed by filtration; and recrystallized from isopropanol to give 4,4-diphenyl-1,2-di(4-pyridyl)-2-butanol melting at 174–176°.

Example 23

A solution of 15 g. (70 mmoles) of 2-phenyl-1-(4-pyridyl)-2-propanol and 0.2 g. iodine in 250 ml. xylene was azeotropically distilled into a Dean-Stark trap for 35 hrs. The reaction mixture was extracted three times with 100 ml. 3 N hydrochloric acid. The acid extract was washed three times with ether and poured into an excess of chilled ammonium hydroxide. Extraction with methylene chloride yielded after drying and vacuum treatment 4-(β-methylstyryl)pyridine as a dark oil. Crystallization from hexane yielded the pure product as yellow plates melting at 51–54.5°.

Example 24

To a stirred solution of gamma-picolyl lithium (0.25 mole) under nitrogen and chilled to −10° C. a solution of 43.5 g. (0.25 mole) of trifluoroacetophenone in 100 ml. of tetrahydrofuran was added dropwise over 1 hr. The reaction mixture was allowed to reach room temperature and was treated with 60 ml. of water and then extracted twice with 125 ml. of 6 N hydrochloric acid. The acid extracts were combined and washed with ether (300×100 ml.) and then were poured into a chilled excess of ammonium hydroxide. Filtration and air drying gave 1-phenyl-2-(4-pyridyl)-1-trifluoromethylethanol as crystals melting at 126–130°. Recrystallization from acetone-water gave the pure product as colorless prisms melting at 130–132°.

Treatment of the base with concentrated hydrochloric acid gave a crystalline hydrochloride which on recrystallization from ethanol melted at 240–245° with decomposition.

Example 25

A solution of 17.5 g. (0.1 mole) of 1-methyl-2-(4-pyridylmethylene)pyrrolidine in ethanol (200 ml.) was reduced at 34 atmospheres in the presence of 5 g. of a 10% palladium on carbon catalyst. After the required amount of hydrogen had been absorbed, the catalyst was separated by filtration and the filtrate concentrated in vacuo. The residue was extracted with petroleum ether (3×200 ml.) and the combined extracts were concentrated in vacuo to give 12.2 g. (69%) of the base as a colorless oil. The oil was dissolved in ethanol and a solution of two equivalents of maleic acid in ethanol was added. Upon the slow addition of ether, the product, 1-methyl-2-(4-pyridylmethyl)pyrrolidine dimaleate, crystallized as yellow prisms, melting at 107–110° C.

Example 26

A solution of 10.0 g. (42 mmole) of 2-(4-chlorophenyl)-1-(4-pyridyl)-2-propanol in 100 ml. of concentrated hydrochloric acid was stirred at 100° for 15 hrs. The reaction mixture was poured into an iced excess of ammonium hydroxide and the crude product removed by filtration and air dried, giving 4-($\beta$-methyl-4-chlorostyryl)pyridine as yellow crystals melting at 60–65°. Recrystallizations from hexane gave the product as colorless prisms melting at 67–8°.

Example 27

A solution of 5.0 g. (21.8 mmole) of 4-($\beta$-methyl-4-chlorostyryl)pyridine in 200 ml. of ethyl acetate was treated with hydrogen at room temperature and atmospheric pressure in the presence of a palladium on carbon catalyst. The theoretical amount of hydrogen was taken up, the catalyst removed by filtration and the solvent distilled off in vacuo leaving the 2-(4-chlorophenyl)-1-(4-pyridyl)propane product as a viscous oil. The crude product was dissolved in ether and treated with anhydrous hydrogen chloride to give the hydrochloride salt as colorless crystals melting at 180–189°. Recrystallizations from ethanol-ether raised the melting point to 192–197°.

Example 28

A solution of 10.0 g. (28.6 mmole) of the dihydrochloride of 1,2-di(4-pyridyl)-1-phenylethanol in 75 ml. of 75% by volume sulfuric acid was stirred for 17 hrs. at 75°. The reaction mixture was poured into an iced excess of ammonium hydroxide and the product removed by extration with ether (300×100 ml.). The etheral solution was dried over magnesium sulfate and concentrated to give 1,2-di(4-pyridyl)-1-phenylethylene melting at 132–137°. Recrystallizations from ether yielded the product as colorless plates melting at 142–144°.

Example 29

A solution of 5.0 g. (19.4 mmole) of 1,2-di(4-pyridyl)-1-phenylethylene in 200 ml. of ethyl acetate was hydrogenated with the theoretical amount of hydrogen at atmospheric pressure and room temperature over a catalyst of palladium on carbon. The catalyst was removed by filtration and the solvent was distilled off in vacuo leaving 1,2-di(4-pyridyl)-1-phenylethane as a viscous oil. Crystallization from methylene chloride-hexane gave the product as colorless prisms melting at 89–92°. Recrystallization from hexane gave an analytical sample melting at 90–94°.

Example 30

A solution of 13.0 g. (50.6 mmole) of 1,1-diphenyl-2-(4-pyridyl)ethylene in 200 ml. of ethyl acetate was reduced in the presence of a palladium on carbon catalyst with hydrogen at room temperature and atmospheric pressure. After the theoretical amount of hydrogen had been absorbed, the catalyst was removed by filtration and the solvent distilled to give the product 1,1-diphenyl-2-(4-pyridyl)ethane melting at 65–69°. Recrystallizations from petrol gave an analytical sample melting at 68–72°.

Example 31

A solution of 4.9 g. (18.3 mmole) of 1-phenyl-2-(4-pyridyl)-1-trifluoromethylethanol in 75 ml. of 75% by volume of sulfuric acid was stirred at 135° for 2 hrs. The cooled reaction mixture was stirred into an iced excess of ammonium hydroxide. The basic mixture was extracted with methylene chloride (3×100 ml.). The extract was dried over magnesum sulfate and reduced in vacuo to give 1-phenyl-2-(4-pyridyl)-1-trifluoromethylethylene as a light yellow oil. The hydrochloride of the product was formed in ether and recrystallized from isopropyl alcohol-ether as colorless prisms melting at 158–171°.

Example 32

A solution of 2.2 g. (8.8 mmole) of 1-phenyl-2-(4-pyridyl)-1-trifluoromethylethylene in 100 ml. of ethyl acetate in the presence of a catalyst of palladium on carbon was allowed to react with the theoretical amount of hydrogen at room temperature and atmospheric pressure. The catalyst was removed by filtration and the solvent distilled off in vacuo leaving the product as a colorless oil which on standing formed crystals of 1-phenyl-2-(4-pyridyl)-1-trifluoromethylethane. Recrystallizations from hexane gave colorless prisms melting at 70–74°.

Example 33

A solution of 9.5 g. (50.5 mmole) of 1-methyl-4-(4-pyridyl-methylene)piperidine in 200 ml. of ethyl acetate was reduced with hydrogen in the presence of a palladium on carbon catalyst. After the theoretical amount of hydrogen had been absorbed, the catalyst was removed by filtration and the solvent evaporated to give $\alpha$-(N-methyl-4-piperidyl)-4-picoline as a light yellow oil. The dihydrochloride was prepared in ether and recrystallized from isopropyl alcohol-ether to give colorless prisms melting at 223–236°.

Example 34

A solution of 88 g. (0.49 mole) of benzylideneaniline in 240 ml. of tetrahydrofuran was added dropwise in 30 min. under dry nitrogen to a stirred solution containing 0.5 mole of 4-picolyl lithium at −30°. The reaction mixture was stirred an additional 30 min. at −30°, and the reaction was quenched by the addition of 150 ml. of water. Extraction with 3 N hydrochloric acid, washing with ether and neutralization by pouring into an excess of ammonium hydroxide at 0° gave the product 1-anilino-1-phenyl-2-(4-pyridyl)ethane as a solid mass. Recrystallization from a methylene chloride-hexane mixture gave the product as colorless plates melting at 118–119°.

A dihydrochloride salt was formed by saturating an ether solution of the base with dry hydrogen chloride. Filtration and recrystallization from methanol-ether gave the salt as colorless plates melting at 182–186°.

Example 35

A solution of 60.2 g. (0.24 mole) of N-benzohydrylidene aniline in 350 ml. of tetrahydrofuran was added over a period of 30 min. under dry nitrogen to a stirred solution containing 0.25 mole of 4-picolyl lithium at −30 to −35°. Stirring was continued 30 min. and the reaction was quenched with 100 ml. of water. Neutralization of the acid extract gave the crude product, M.P. 210–232°. Several recrystallizations from methylene chloride gave the pure product 1-anilino-1,1-diphenyl-2-(4-pyridyl)ethane as colorless prisms, melting at 234–236°.

The monohydrochloride salt was formed by saturating an ether solution of the base with dry hydrogen chloride. Filtration and recrystallization from ethanol-ether gave the salt as yellow plates melting at 199–201° with decomposition.

Example 36

A solution of 29.8 g. (0.25 mole) of N-benzylidenemethylamine in 90 ml. of tetrahydrofuran was added over a period of 20 min., under dry nitrogen, to a solution containing 0.25 mole of 4-picolyl lithium at −40 to −45°, and stirring was continued 30 min. at −40°. The reaction was quenched with 100 ml. of water and extracted with 3 N hydrochloric acid. The acid extract was washed with ether and neutralized with ammonium hydroxide. The crude product was separated from the aqueous phase and was distilled. The pure product 1-methylamino-1-phenyl-2-(4-pyridyl)ethane was taken as the fraction, boiling at 112–115° at 0.3 mm.

For purposes of identification the benzamide derivative was prepared by the reaction of a solution of the base in benzene with benzoyl chloride. Recrystallization of the product from an ethanol-ether mixture gave directly the hydrochloride salt of N-methyl-N-[1-phenyl-2-(4-pyridyl)ethyl]benzamide hydrochloride as colorless prisms melting at 183–186°.

Example 37

A solution of 11.2 g. (0.05 mole) of 4-dimethylaminobenzylideneaniline in 25 ml. of tetrahydrofuran was added to a solution containing 0.05 mole of 4-picolyl lithium at −30°. The reaction mixture was quenched with 100 ml. of water and 100 ml. of ether was added. The organic layer was separated and reduced in vacuo to give the product 1-anilino-1-(4-dimethylaminophenyl)-2-(4-pyridyl)ethane. Recrystallization from ethanol gave the pure compound as colorless plates melting at 198–200°.

Example 38

A solution of 10.8 g. (0.05 mole) of benzylidene-3-chloroaniline in 25 ml. of tetrahydrofuran was added to a stirred solution containing 0.05 mole of 4-picolyl lithium at −50°. The reaction was stirred at −50° for 1.5 hr. The reaction was quenched with 100 ml. of water and 100 ml. of ether was added. The organic layer was separated and reduced in vacuo to an oil which, after crystallization from a methylene chloride-hexane mixture, gave the crude product melting at 131–134°. Recrystallization from an ethanol-hexane mixture gave the pure compound 1-(3-chloroanilino)-1-phenyl-2-(4-pyridyl)ethane melting at 136–137.5°.

Example 39

A solution of 5.0 g. (24 mmole) of the oxime of 4-phenacylpyridine was hydrogenated in 80 ml. of ethanol over 5 g. of Raney nickel at room temperature and under atmospheric pressure. When the theoretical amount of hydrogen had been absorbed, the reaction was stopped and the catalyst was removed by filtration. The filtrate was evaporated under reduced pressure to give a semicrystalline mass. Repeated recrystallization of this residue from hexane gave the pure product 1-phenyl-2-(4-pyridyl)ethylamine as colorless needles melting at 66–68°.

Example 40

A solution of 20 g. of 1-methyl-4-(4-pyridylmethyl)-4-piperidinol prepared as in Example 14 above in 50 ml. of concentrated sulfuric acid was heated at 75° for 20 hr. The solution was cooled, poured over ice, made basic with ammonium hydroxide and extracted with dichloromethane (3×100 ml.). The organic extracts were combined, washed with water (3×100 ml.), dried over anhydrous sodium sulfate, filtered and evaporated to give the pyridylmethylene compound as a colorless oil. A portion of the base (2.0 g.) dissolved in 100 ml. of ether was saturated with dry hydrogen chloride gas and the resulting precipitate was separated by filtration. Recrystallization from an isopropanol-ether mixture gave the pure dihydrochloride salt of 1-methyl-4-(4-pyridylmethylene)piperidine as colorless prisms melting at 186° with decomposition.

Example 41

A solution of 10.0 g. (35.4 mmole) of 1-phenyl-2)4-pyridyl)1-(2-thienyl)ethanol prepared as in Example 5 above and 0.5 g. of iodine in xylene was refluxed for 48 hrs. The solution was cooled and extracted with 6 N hydrochloric acid. The extract was poured over iced ammonium hydroxide and extracted with methylene chloride to give after drying and removal of the solvent an oil which was crystallized from hexane. Recrystallizations from hexane gave colorless needles of 1-phenyl-2-(4-pyridyl)-1-(2-thienyl)ethylene melting at 85–90°.

Example 42

To a solution of 0.5 mole 4-picolyl lithium, 25 g. (0.12 mole) of dibenzosuberone was added and the reaction mixture was stirred at room temperature one hour. The addition of water was followed by acid extraction, the acid extract neutralized and the product removed by filtration. The product was treated with charcoal and crystallized from ethanol giving 5-(4-pyridylmethyl)-dibenzo[a,d][1,4]cyclohepta-dien-5-ol, M.P. 173–175°. Further recrystallizations from ethanol gave colorless needles, M.P. 175–176°.

Example 43

A solution of 15 g. (0.05 mole) of 5-(4-pyridylmethyl)dibenzo[a,d][1,4]cyclohepta-dien-5-ol prepared as above in 100 ml. of 60 percent sulfuric acid was stirred overnight at 70°. The cooled reaction mixture was neutralized, the crude product removed by filtration and crystallized from hexane giving 5-(4-pyridylmethylene)-dibenzo[a,d][1,4]cycloheptadiene, M.P. 125–127°. Recrystallizations from hexane gave colorless prisms, M.P. 130.5–133°.

Example 44

To a solution of 4-picolyl lithium (0.12 mole) was added 14.7 g. (0.12 mole) of 3-isopropylpentan-2-one. The red reaction mixture was stirred 20 min. at room temperature and 60 ml. of water was added. The reaction mixture was extracted with 6 N hydrochloric acid and the extract neutralized with ammonium hydroxide giving 13.3 g. of a colorless solid. Crystallization from hexane gave colorless plates of 3-isopropyl-2-methyl-1-(4-pyridyl)-2-pentanol, M.P. 101–103°. Recrystallizations from hexane raised the melting point to 102–103.5°.

Example 45

To a solution containing 0.2 mole of 4-picolyl lithium, 39.24 g. (0.2 mole) of xanthone was added and the reaction mixture was stirred at room temperature for 1 hour. The reaction mixture was treated with water and extracted with 6 N hydrochloric acid. Neutralization of the extract and filtration gave solid 9-(4-pyridylmethylene)xanthene melting at 125–130°. Recrystallization from ethanol-water gave yellow needles, M.P. 133–134.5°.

Example 46

A solution of 5 g. (18 mmole) of 9-(4-pyridylmethylene)xanthene prepared as above in 250 ml. of ethanol was hydrogenated at atmospheric pressure and room temperature over a 10 percent palladium-on-charcoal catalyst. The catalyst and solvent were removed giving an oil which crystallized on standing to give 9-(4-pyridylmethyl)xanthene melting at 65–68°. Recrystallizations from hexane-petrol gave colorless prisms, M.P. 66–69°.

A hydrochloride was prepared which after recrystallization from methylene chloride-ether formed colorless plates, M.P. 181–190°.

We claim:
1. 2-methyl-1-(4-pyridyl)-2-propanol maleate.
2. 1,1-diethyl-2-(4-pyridyl)ethanol.
3. 2-(phenoxymethyl)-1-(4-pyridyl)-2-propanol.
4. 1,1 - bis(4 - dimethylaminophenyl)-2-(4-pyridyl)-ethanol.

5. 1-phenyl-2-(4-pyridyl)-1-trifluoromethylethanol.
6. A compound of the formula

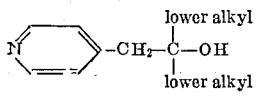

7. A compound of the formula

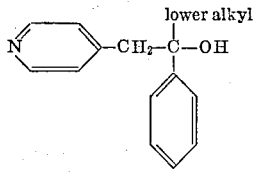

8. A compound of the formula

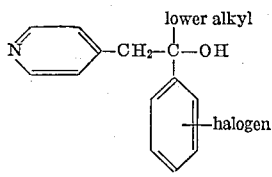

9. 3(1 - methylpiperazino) - 2-phenyl-1-(4-pyridyl)-2-propanol.
10. 3 - morpholino - 2-phenyl-(4-pyridyl)-2-propanol.
11. 4,4-diphenyl-1,2-di(4-pyridyl)-2-butanol.
12. 2(4-chlorophenyl)-1(4-pyridyl)-2-propanol.
13. 2-phenyl-1(4-pyridyl)-2-propanol.
14. 2(2-chlorophenyl)-1(4-pyridyl)-2-propanol.

References Cited

UNITED STATES PATENTS

| | | | |
|---|---|---|---|
| 2,794,807 | 6/1957 | Krapcho | 260—297 |
| 2,756,237 | 7/1956 | Cislak | 260—297 |

OTHER REFERENCES

Wright et al.: Chem. Abstract, vol. 60, Par. 5449. S450 (1964).

Kloppenburg et al.: Rec. Trav. Chim. T. 65, pp. 396–97 (1941).

HENRY R. JILES, *Primary Examiner.*

A. L. ROTMAN, *Assistant Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,400,126                          September 3, 1968

Bernard Brust et al.

It is certified that error appears in the above identified patent and that said Letters Patent are hereby corrected as shown below:

Column 2, line 27, after "substituted" insert -- phenyl --. Column 4, line 73, "and II" should read -- and III --. Column 7, line 26, "-(4-pyridyl-2-" should read -- -(4-pyridyl)-2- --. Column 9, line 40, "ethanol/mixture" should read -- ethanol/ether mixture --.

Signed and sealed this 27th day of January 1970.

(SEAL)
Attest:

Edward M. Fletcher, Jr.                      WILLIAM E. SCHUYLER, JR.

Attesting Officer                               Commissioner of Patents